June 19, 1923.
J. J. DOUGHERTY
CHAIN LINK SHOE
Filed Feb. 8, 1922
1,459,091
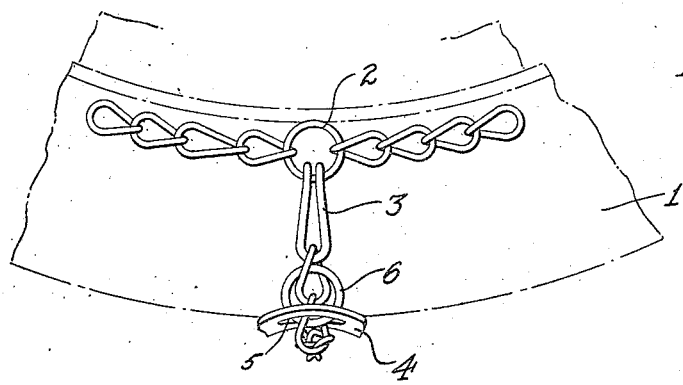
Fig. 1.
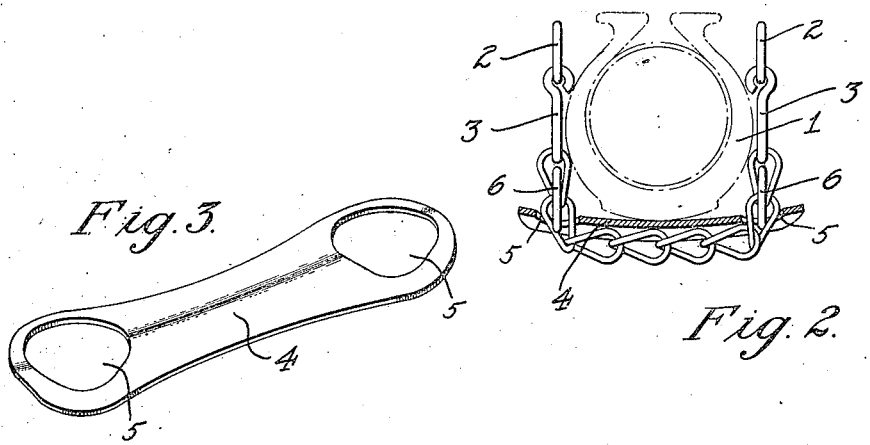
Fig. 3.
Fig. 2.
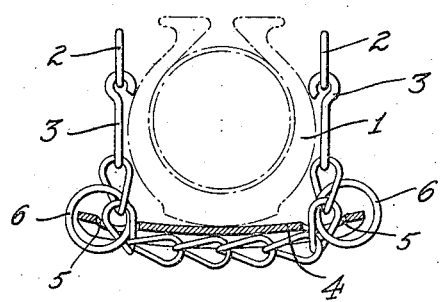
Fig. 4.
Inventor:-
John J. Dougherty,
By Frank A. Kane, his Attorney Patented June 19, 1923.

1,459,091

UNITED STATES PATENT OFFICE.

JOHN J. DOUGHERTY, OF SCRANTON, PENNSYLVANIA, ASSIGNOR OF ONE-HALF TO WILLIAM P. BOLAND, OF SCRANTON, PENNSYLVANIA.

CHAIN-LINK SHOE.

Application filed February 8, 1922. Serial No. 534,952.

*To all whom it may concern:*

Be it known that I, JOHN J. DOUGHERTY, a citizen of the United States, and a resident of Scranton, Pennsylvania, have invented certain new and useful Improvements in a Chain-Link Shoe, set forth in the annexed specification, reference being had therein to the accompanying drawing.

This invention comprises a chain link shoe. It is contemplated to provide a shoe or protective device to be associated with anti-skid chains and like devices, and wherein there will be placed between the chain and tire a solid bearing surface of greater width than the ordinary anti-skid chain; wherein this shoe may be attached to and detached from a chain easily, offering protection to the tire from sharp, broken, or the ordinary chain link wear and helping to give better tractive grip when used in sand, mud or loose ground.

Other objects and advantages will in part be apparent and in part be brought out more fully in the description which follows.

A drawing illustrating an embodiment of the invention accompanies the specification, the following views being shown:

Fig. 1, is a partial view in side elevation showing the application of the device to an anti-skid chain as usually attached to a tire.

Fig. 2, is a view in end elevation of the same, the shoe being shown in longitudinal section.

Fig. 3, is a view in perspective of the shoe; and

Fig. 4, a view similar to Fig. 2, but of a slightly modified form of construction.

In these views, 1 represents a tire, associated with which there is an anti-skid device comprising side members joined by links 2 and cross chains secured to the links 2 as by hooks 3. In practice the cross links with the hooks attached may be had separately and attached to the side members as needed.

The present invention comprises a shoe, guard, or protective device including a body portion 4 having a road engaging or outer surface concave in cross section so as to constitute a housing for a cross chain and provided with openings 5, one at each end of the body portion, through which the cross chains are adapted to pass and hold it in engagement with the tire tread when applied thereto as shown in Figs. 1 and 3, for instance. The tire tread engaging or inner portion of the shoe or protector is convex in cross section and slightly bowed upwardly from the centre toward its ends so as to follow the contour of the tire surface. It is slightly wider than the tread portion of the tire to which it is to be attached and means are provided for preventing the shoe slipping to one side or the other and for maintaining it in place in the event that the cross chain might be broken.

In Fig. 2, there is provided, at each end of the shoe, a ring 6, of sufficient diameter to prevent the shoe from slipping to either side. The rings 6 are made larger than the openings 5 in the shoe and bear upon the upper surface of the shoe at opposite sides thereof, thus maintaining it in proper position. In this construction the shoe is permitted to be thrown away from the tire in the event that the cross chain is broken at a point between the rings.

In Fig. 4, the rings 6 are shown passing through certain of the links of the cross chain and also through the openings 5 in the shoe. In this construction, the rings 6 are made originally with an open portion which permits the rings to be slipped into position by passing an end of the ring through opening 5 in the shoe and through certain of the cross links. When it is in position the ring is closed and welded. The effect of this arrangement is to hold the shoe in fixed position when any of the cross links on the tread portion may be broken.

While it is disclosed in the present embodiment, certain changes are contemplated as within the scope of the invention as set forth in the claim.

What I claim is:

As an article of manufacture a chain link shoe comprising a body portion curved in cross section, to constitute a concave housing for an anti-skid chain between the road engaging surface of the shoe and the road;

said body portion being provided at each opposite end with an opening adapted to encircle a cross chain and permit it to freely pass through the opening; said body portion being slightly bowed on its tread engaging surface between the openings; and ring members operatively associable with the cross chain and shoe to maintain the shoe in predetermined position on the cross chain.

In testimony whereof I affix my signature.

JOHN J. DOUGHERTY.